United States Patent [19]
Hwang et al.

[11] Patent Number: 6,122,369
[45] Date of Patent: Sep. 19, 2000

[54] COMMUNICATION PROCESS DEVICE AND METHOD THEREFOR

[75] Inventors: Jong-Soo Hwang; Kyung-Joon Chun, both of Seoul, Rep. of Korea

[73] Assignee: Samsung Electronics Co., Ltd., Rep. of Korea

[21] Appl. No.: 08/862,158

[22] Filed: May 22, 1997

[30] Foreign Application Priority Data

May 22, 1996 [KR] Rep. of Korea ...................... 96-17523

[51] Int. Cl.⁷ ..................................................... H04M 9/00
[52] U.S. Cl. ........................... 379/420; 379/373; 379/430; 455/550
[58] Field of Search ..................... 379/420, 373, 379/430, 387, 389, 422, 256; 455/575, 90, 91, 550, 351, 569; 381/74, 111, 112

[56] References Cited

U.S. PATENT DOCUMENTS

| | | | |
|---|---|---|---|
| 5,475,872 | 12/1995 | Sato | 379/373 |
| 5,487,182 | 1/1996 | Hansson | 379/420 |
| 5,642,402 | 6/1997 | Vilmi et al. | 379/420 |
| 5,802,167 | 9/1998 | Hong | 379/388 |

*Primary Examiner*—Forester W. Isen
*Assistant Examiner*—Jacques M. Saiint-Surin
*Attorney, Agent, or Firm*—Dilworth & Barrese

[57] ABSTRACT

A device for attaching a earphone key to an earphone-microphone used for a portable phone and performing communication operations and a method therefor. The communication process device of a portable phone including: an earphone-microphone having an earphone key and a plug; a jack for transmitting the voice signal received from a counterpart station to the earphone-microphone upon insertion of the plug and for transmitting a user's voice signal; an earphone-microphone detection unit for generating an earphone-microphone signal upon insertion of the plug; an earphone key sensing unit for generating an earphone key signal upon input of the earphone key; a micro processor for controlling communication functions upon sensing presence/absence of input of the earphone-microphone signal, if the earphone key signal is inputted upon sense of a ring, if the earphone key signal is inputted after input of a telephone number, and if, during communication, the earphone key signal is not inputted for given time; an audio processor for processing a voice upon calling by control of the micro processor; and an earphone-microphone selection unit for selecting a microphone of the earphone-microphone by the external microphone selection signal.

2 Claims, 5 Drawing Sheets

COMMUNICATION PROCESS DEVICE AND METHOD THEREFOR

BACKGROUND OF THE INVENTION

1. Field of the Invention

The present invention relates generally to a communication process device and method therefor in a portable phone. More particularly, it relates to a device and a method for performing operations required for communication by attaching an earphone key to an earphone-microphone which is used for a portable phone.

2. Description of the Related Art

Nowadays, a portable phone including a unitary form earphone-microphone is produced so that a user can call by the portable phone with putting it in a bag or a pocket. However, there are disadvantages in that the user needs to press a SEND button of the portable phone before a call can be completed. Further, in the case of finishing the call, a user needs to press an END button in the portable phone.

SUMMARY OF THE INVENTION

Accordingly, it is an object of the present invention to provide a device for attaching an earphone key to a earphone-microphone used for a portable phone and performing operations required for communication, and a method therefor.

According to a technique for achieving the above objects, the present invention provides a communication process device using a portable phone including: an earphone-microphone having an earphone key and a plug; a jack including a first terminal for passing voice signal upon insertion of the plug and a second terminal for transmitting a user's voice signal; an earphone-microphone detection unit for generating an earphone-microphone signal upon insertion of the plug; an earphone key sensing unit for generating an earphone key signal upon input of the earphone key; a micro processor for generating an external microphone selection signal or an external speaker driving signal by presence/absence of input of the earphone-microphone signal, connecting a speech path to the calling or called party if the earphone key signal is inputted upon sensing a ring, connecting a speech path of the called party by dialing a number of the called party if the earphone key signal is inputted after input of the telephone number thereof, and blocking a tone upon calling if the earphone key signal is not inputted for a given time; an audio processor for processing a voice upon calling by control of the micro processor; and an earphone-microphone selection unit for selecting the microphone of the earphone-microphone by the external microphone selection signal.

BRIEF DESCRIPTION OF THE DRAWINGS

These and various other features and advantages of the present invention will be readily understood with reference to the following detailed description taken in conjunction with the accompanying drawing: wherein.

DETAILED DESCRIPTION OF THE PREFERRED EMBODIMENTS

Figure 1:
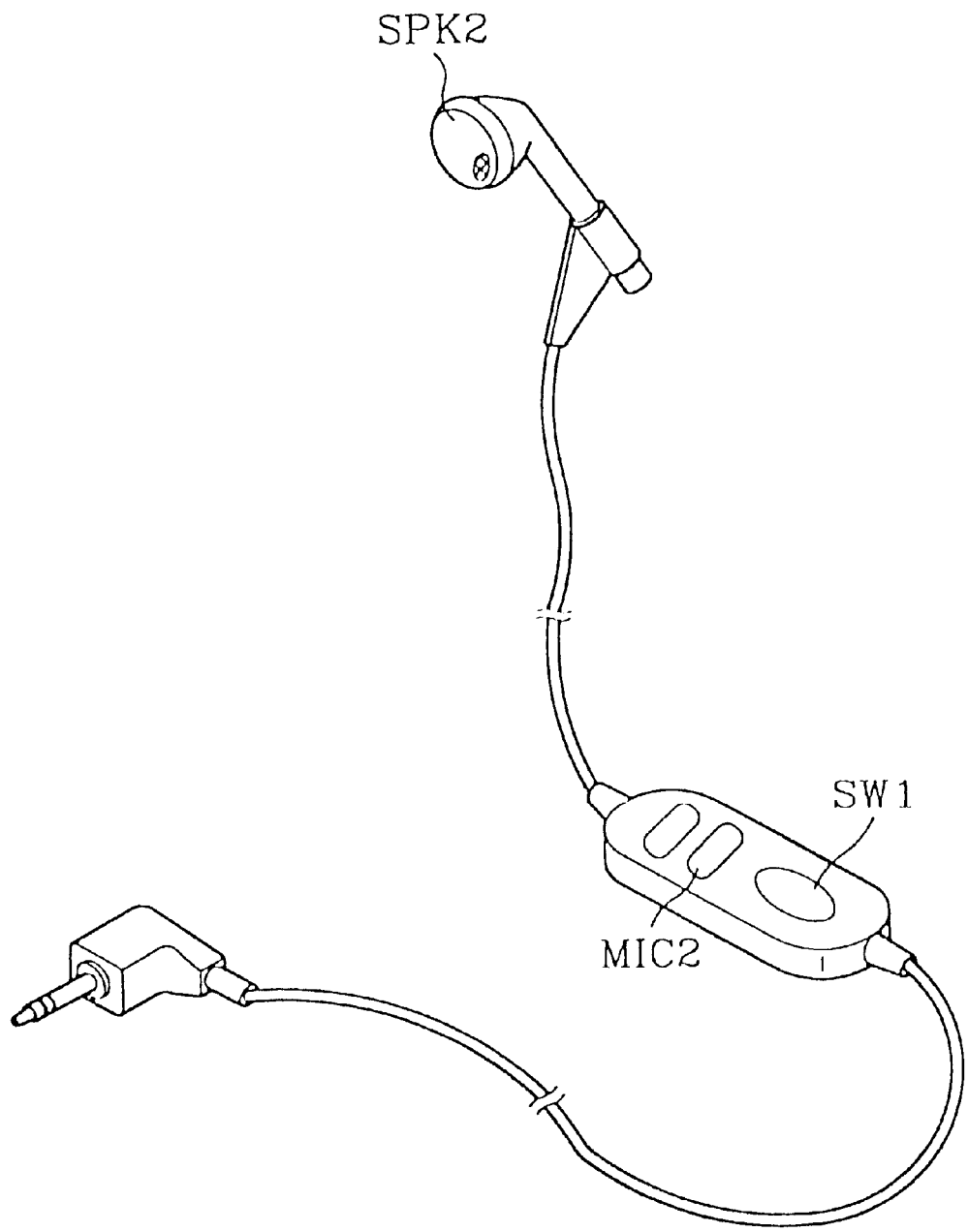
FIG. 1 is a perspective view illustrating an earphone-microphone according to the present invention.

Hereinafter, a preferred embodiment of the present invention will be discussed in detail with reference to the accompanying drawings.

It should be noted that like reference numerals are used for like elements though they may be displayed in a separate drawing. Further, in the following description, numerous specific details such as particular components for the specific circuits are set forth to provide a more thorough understanding of the present invention. It will be apparent, however, to one skilled in the art that the present invention may be practiced without these specific details. Furthermore, the detailed description of known functions and construction details unnecessarily obscuring the subject matter of the present invention is avoided in the following description.

FIG. 1 is a perspective view illustrating an earphone-microphone according to the present invention. Here, this phone further includes an earphone key SW1 different from the prior art earphone-microphone used for the portable phone.

Figure 2:
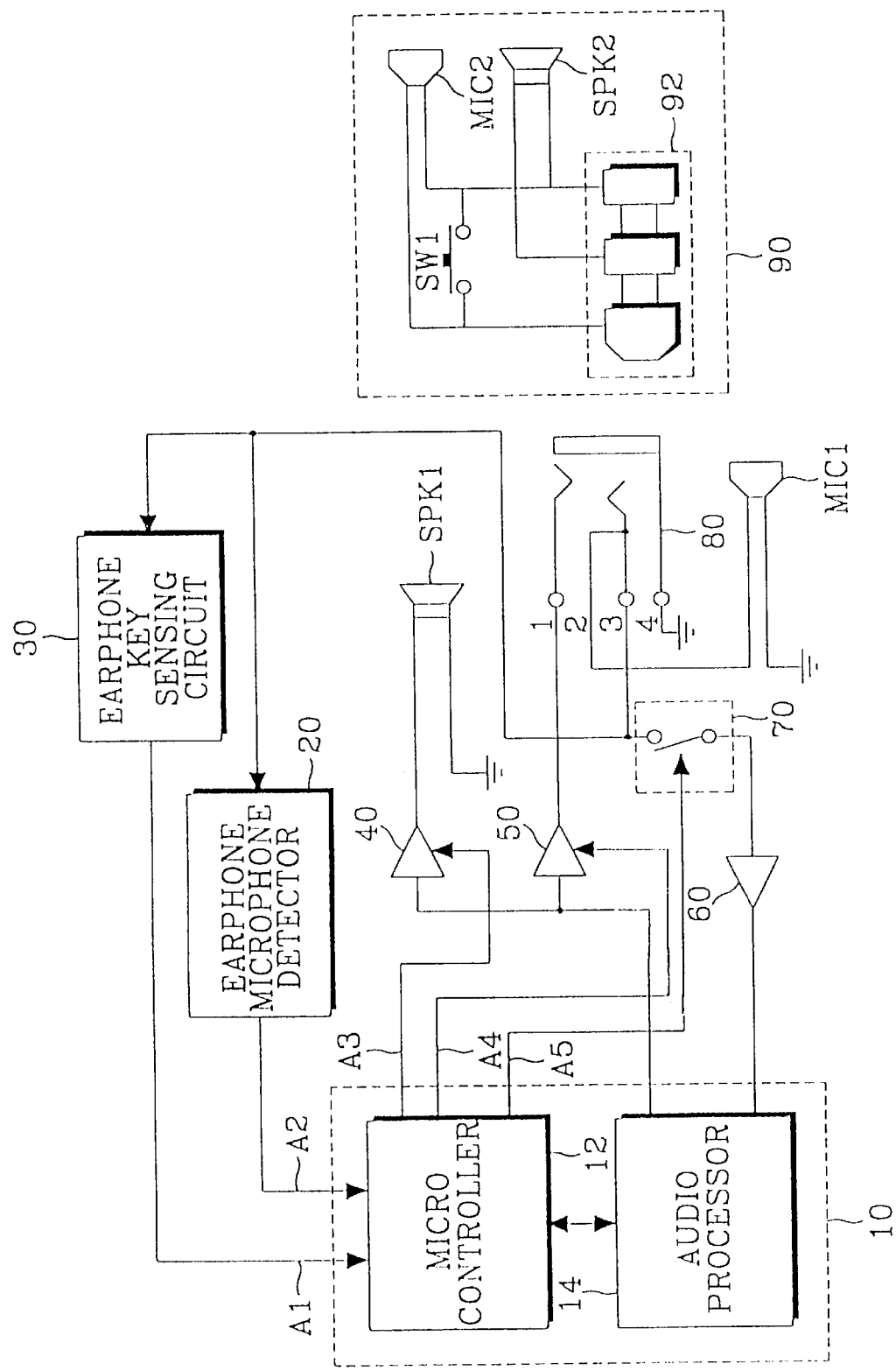
FIG. 2 is a schematic block diagram illustrating communication process device according to the present invention.

FIG. 2 is a schematic block diagram illustrating a communication process device according to the present invention.

Here, the communication process device is comprised of a earphone-microphone 90, an internal speaker SPK1, an internal microphone MIC1, a jack 80, an earphone-microphone detector 20, an earphone key sensing circuit 30, an inside circuit 10, an earphone-microphone selector 70, an inside speaker amplifier 40, an outside speaker amplifier 50, and a microphone amplifier 60.

Thereinbefore, the aforesaid earphone-microphone 90 includes; an earphone key SW1 for generating an earphone signal when SW1 is depressed; an earphone SPK2 for outputting a voice signal received from a counterpart; a microphone MIC2 for converting a user's voice into an electric voice signal; and a plug 92 for making a transmitting path to transmit the electric voice signal and the voice signal received from the counterpart.

Also, the jack 80 is constituted of; a first terminal 1 for transmitting the voice signal received from the counterpart to the earphone-microphone 90 upon insertion of the plug 92; a second terminal 2 for transmitting the electric voice signal; a third terminal 3 for transmitting the electric voice signal upon non-insertion of the plug 92; and a ground terminal 4.

Further, the earphone-microphone detector 20 is coupled to the third terminal 3 of the jack 80 and generates an earphone-microphone signal A2 upon insertion of the plug 92.

The earphone key sensing circuit 30 is coupled to the third terminal 3 thereof and generates an earphone key signal A1 upon input of an earphone signal.

The internal circuit 10 as stated in the above is composed of: a micro controller 12 and an audio processor 14 for processing voice upon calling by control of the micro controller 12. Therein, the micro controller 12 controls the overall operations required during the communication. First, the micro controller 12 generates an external microphone selection signal A5 and an external speaker driving signal A4 by input of the earphone-microphone signal A2. In the meanwhile, if the earphone-microphone signal A5 is not generated for a given time, an internal speaker driving signal A3 is generated. Further, in case that the earphone key signal A1 is inputted upon sense of a ring, a user can communicate with the calling or called party. Furthermore, if the earphone key signal A1 is inputted upon communication, the connection is completed. However, if the earphone key signal A1 is inputted after inputting a telephone number, the connection or communication is performed with the called party by dialing the number. If the earphone key signal A1 is inputted during the communication, the communication is completed. In the meanwhile, if the earphone key signal A1 is not inputted for a given time during the communication, the tone is blocked. Herein, if the earphone key signal A1 is inputted upon blocking the tone, the tone is passed.

In addition, the earphone-microphone selector 70 selects the microphone MIC2 of the earphone-microphone 90 by the external microphone selection signal A5. Also, the internal speaker amplifier 40 is driven by the internal speaker driving signal A3 and the external speaker amplifier 50 is driven by the outside speaker driving signal A4. The microphone amplifier 60 amplifies the electric voice signal received from the microphone MIC2.

Figure 3:
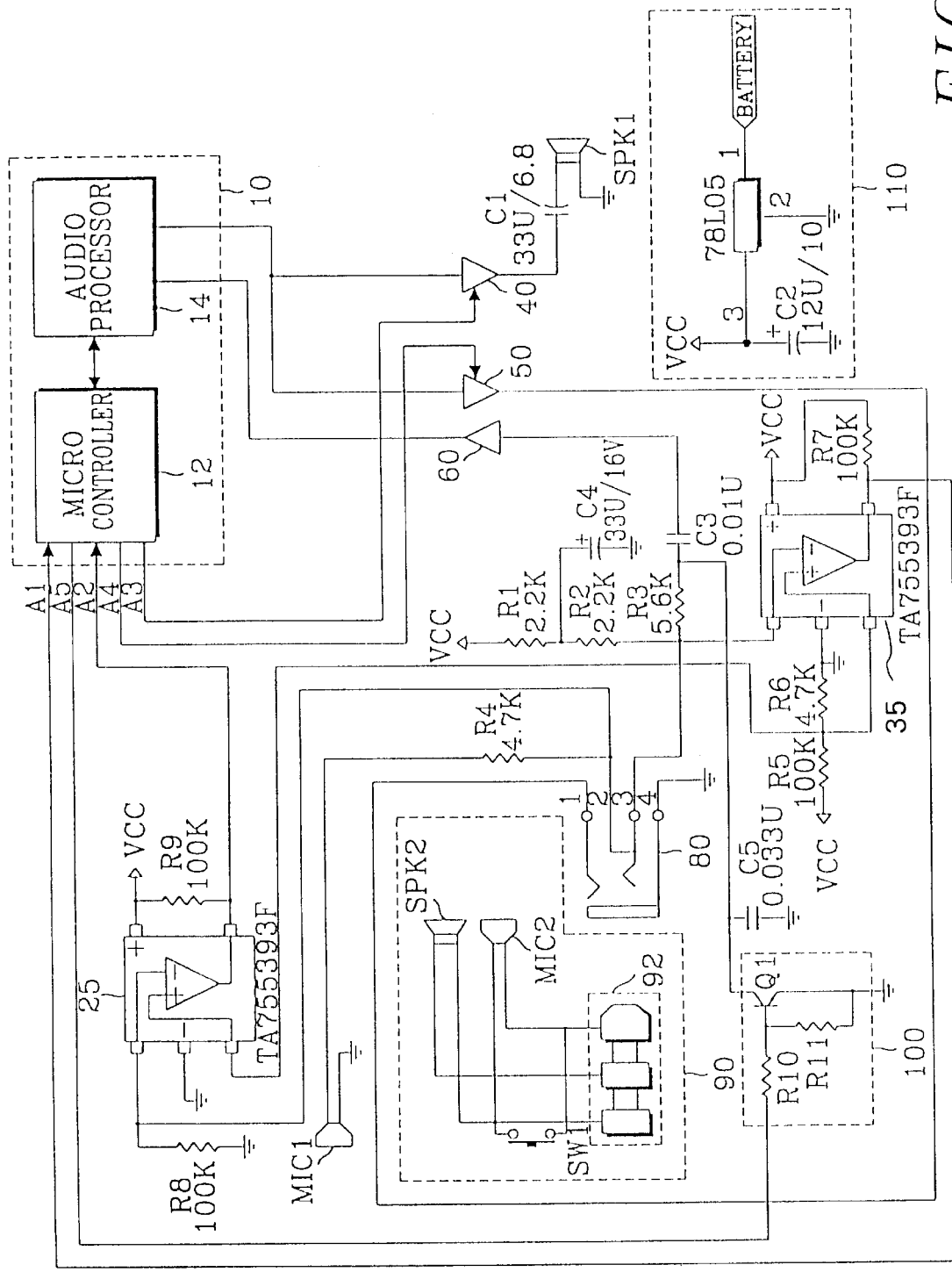
FIG. 3 illustrates a communication process device according to a preferred embodiment of the present invention.

FIG. 3 illustrates the communication process device according to a preferred embodiment of the present invention.

Figure 4:
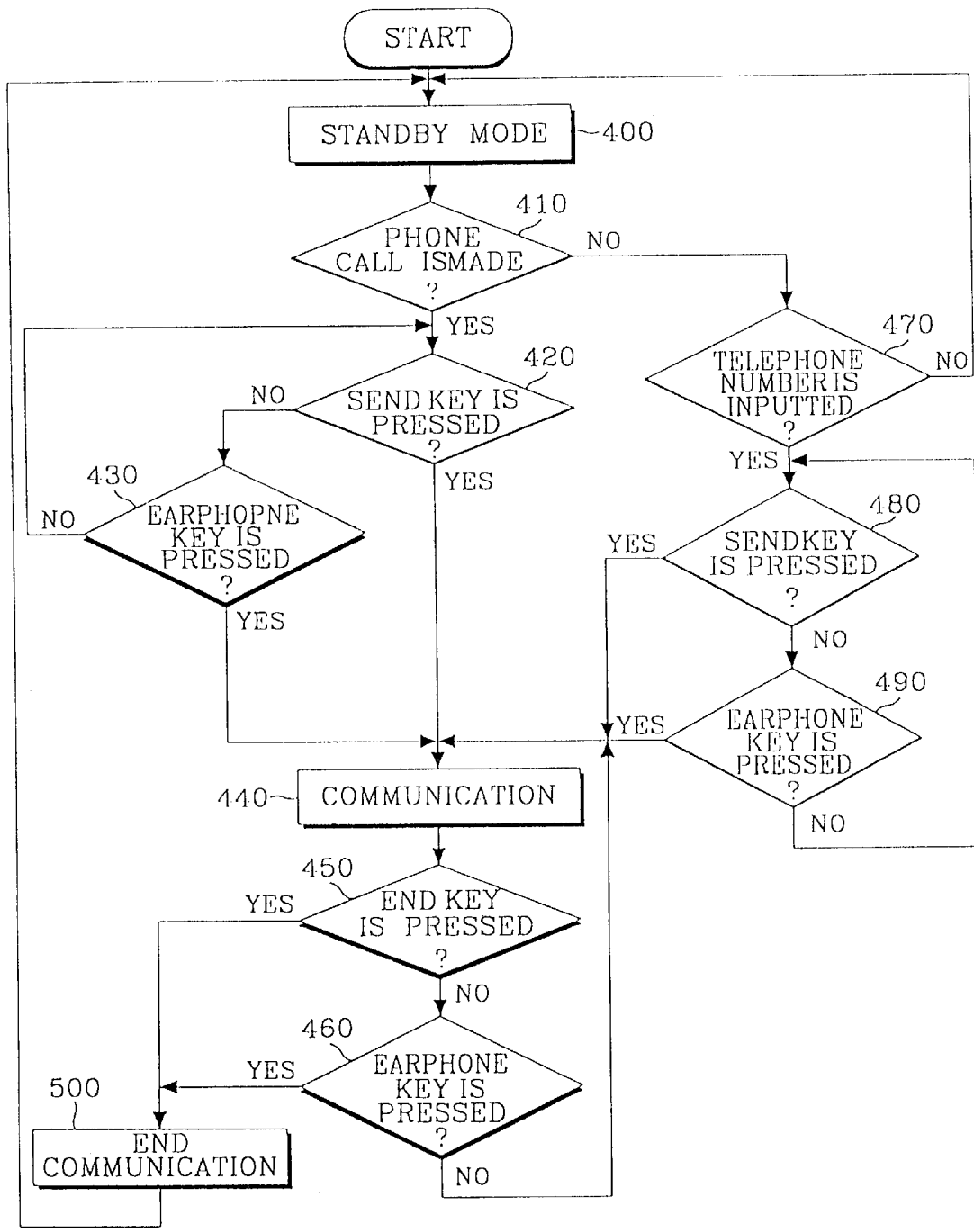
FIG. 4 is a flow chart illustrating the communication process method according to another preferred embodiment of the present invention.
Figure 5:
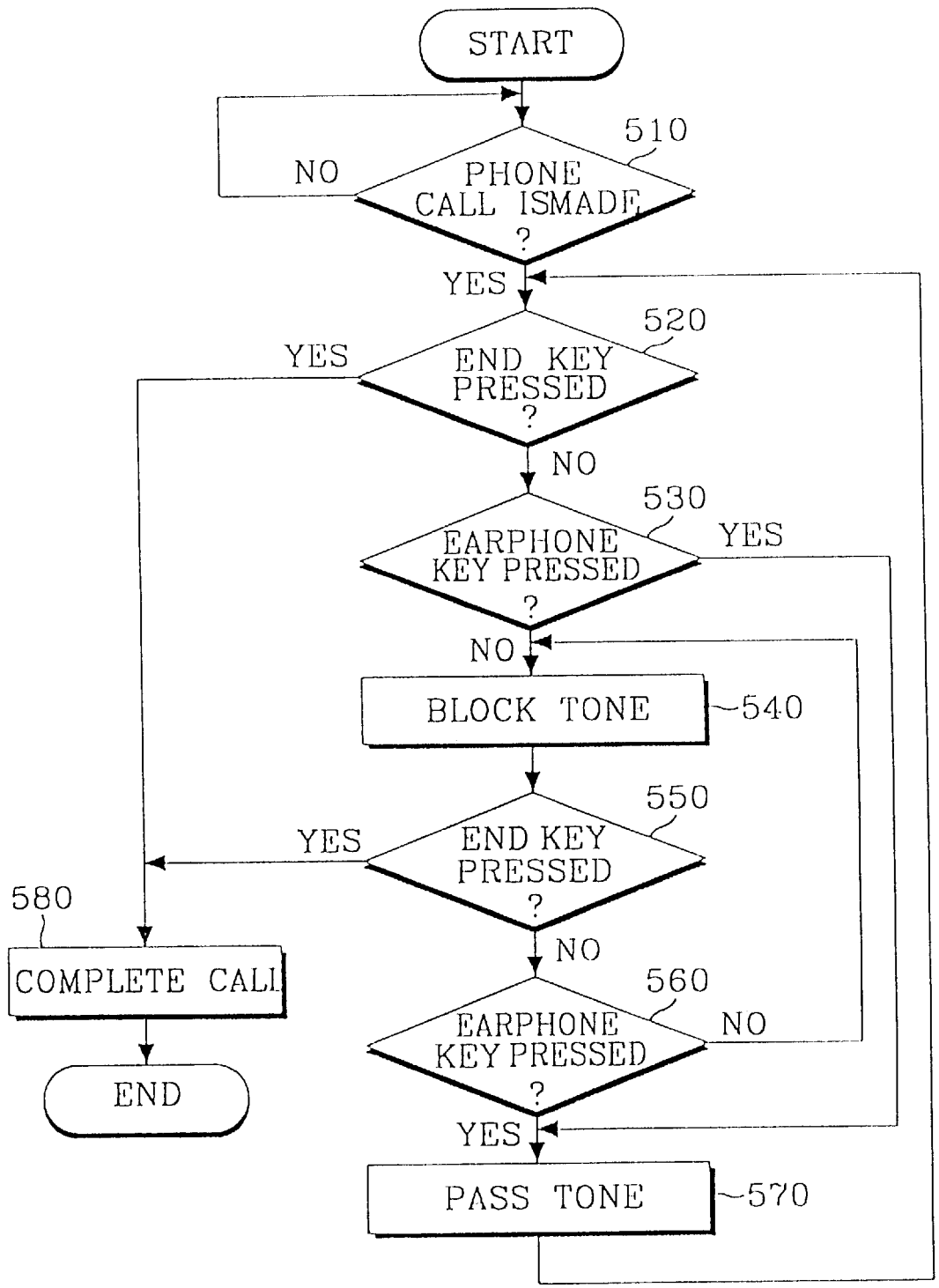
FIG. 5 is a flow chart illustrating the communication process method according to a preferred embodiment of the present invention.

FIG. 4 is a flow chart illustrating the communication process method according to a preferred embodiment of the present invention; and FIG. 5 is a flow chart illustrating the communication process method according to another preferred embodiment of the present invention.

Hereinafter, a preferred embodiment of the present invention will be discussed in detail with reference to FIGS. 3 to 5.

After standby state at step 400, the micro controller 12 of FIG. 3 checks at step 410 whether or not the call is made from the counterpart. Here, when the call was made therefrom, the micro controller 12 checks at step 420 whether or not a SEND key is pressed at step 420. Thus, if the SEND key was pressed, the micro controller 12 performs the communication at step 440. Upon call, at step 440 a user's voice is converted into the electric voice signal through the inside microphone MIC1. After that, the electric voice signal is inputted to the earphone-microphone amplifier 60 via the second terminal 2 and the third terminal 3 of the jack 80. The earphone-microphone amplifier 60 amplifies the electric voice signal and then applies the amplified signal to the audio processor 14. The audio processor 14 codes the electric voice signal amplified in the earphone-microphone amplifier 60 and then transmits the coded signal to the counterpart through a RF terminal (not illustrated). However, at the aforesaid step 420, if the SEND key was not pressed therefrom, the micro controller 12 proceeds to step 430, thereby checking whether or not the earphone key SW1 is pressed. Here, this check is performed under the condition that the plug 92 of the earphone-microphone 90 is inserted to the jack 80. If the plug 92 is inserted to the jack 80, the second terminal 2 and the third terminal 3 connection is opened. Thus, the inverting terminal of the earphone-microphone amplifier 25 causes the earphone-microphone detecting signal A2 to have a logic "high" level because a resistor R8 is pulled down to a ground terminal. The micro controller 12 generates the external speaker driving signal A4 and the outside microphone selection signal A5. The outside speaker driving signal A4 drives the outside speaker amplifier 50. At step 430 as stated in the above, if the earphone key SW1 is pressed, the micro controller 12 proceeds to step 440, thereby performing the communication. Thereafter, at step 450, the micro controller 12 checks whether or not a END key is pressed. If so, the controller 12 ends the communication. However, when the END key is not inputted, the micro controller 12 checks at step 460 whether or not the earphone key SW1 is inputted. If the earphone key SW1 is inputted in the process of communicating, the inverting terminal of the earphone key sensing amplifier 35 is connected to the ground terminal. Thus, the earphone key signal A1 having a logic "high" level is generated at an output terminal of the earphone sensing amplifier 35. Further, the micro controller 12 responds to input of the earphone key signal A1 and then proceeds to step 500, thereby completing the communication.

Further, at step 410, if the call was not made, the micro controller 12 checks at step 470 whether or not the telephone number is inputted. Herein, when the telephone number was inputted, the micro controller 12 proceeds to step 480, thereby checking whether or not the SEND key is inputted. At this time, if the SEND key is inputted at the step 480, the micro controller 12 dials the number to the counterpart, thereby performing the communication process at step 440. However, at the above step 480, if the SEND key is not inputted, the micro controller 12 checks at step 490 whether or not the earphone key is inputted. However, if the earphone key is inputted at step 490, the micro controller 12 returns to the step 440.

Referring to FIG. 5, the micro controller 12 checks at step 510 whether or not a call is made. Herein, when the call was not made, the micro controller 12 returns to the above step 510. However, when the call was made, the micro controller 12 proceeds to step 520, thereby checks whether or not an END key is pressed. At this time, if the END key is pressed, the micro controller 12 proceeds to step 580, thereby completing the communication process. In the meanwhile, if the END key is not pressed, the micro controller 12 checks at step 530 whether or not the earphone key SW1 is pressed. At the above step 530, if the earphone key SW1 is not pressed, the micro controller 12 blocks the tone at step 540. However, the above operation for muting the tone generates the earphone key signal A1 having a logic high level at the earphone key sensing amplifier 35 upon input of the earphone key SW1. Then, the micro controller 12 generates the earphone-microphone selection signal A5 and inputs it to a mute unit 100, turning transistor Q1 on. A user's electric voice signal inputted through the third terminal 3 of the jack 80 is transmitted to the ground terminal, so that the signal is not transmitted to the counterpart. Thus, the counterpart cannot listen to the user's voice. Then, the micro controller 12 at step 550 checks whether or not the END key is pressed. At this time, if the END key is pressed, the micro controller 12 proceeds to step 580, thereby ending the communication. However, if the END key is not inputted at step 550, the micro controller 12 checks at step 560 whether or not the earphone key SW1 is pressed. Herein, the above operation, which is to check the input of the earphone key SW1, acts to release the blocking of the tone. At the above step 560, if the earphone key SW1 is pressed, the earphone key signal A1 having the logic high level is generated at step 570 in the earphone key sensing amplifier 35. Then, the micro controller 12 generates the earphone-microphone selection signal A5 having the logic low level and inputs it to the mute unit 100. The transistor Q1 of the mute unit 100 is switched off. And thereafter, the user's electric voice signal inputted through the third terminal 3 of the jack 80 is applied to the earphone-microphone amplifier 60. The earphone-microphone amplifier 60 amplifies the user's electric voice signal and then applies it to the audio processor 14.

As described in the above, the present invention has an advantage in that the earphone-microphone used for the portable phone further includes the earphone key so that the user can use it more conveniently.

While the present invention has been described with reference to a specific embodiments, the description is illustrative of the invention and is not to be constructed as limiting the invention. Various modifications may occur to those skilled in the art without departing from the true spirit and scope of the invention as defined by the appended claims.

What is claimed is:

1. A communication process device of a portable phone comprising:

an earphone-microphone having an earphone key, and a plug;

a jack including a first terminal for transmitting a voice signal received from a called or calling party to said earphone-microphone upon insertion of said plug and a second terminal for transmitting a user's voice signal;

an earphone-microphone detection unit for generating an earphone-microphone signal upon insertion of said plug;

an earphone key sensing unit for generating an earphone key signal upon input of said earphone key;

a micro processor for generating an external microphone selection signal or an external speaker driving signal by presence/absence of input of said earphone-microphone signal, connecting a speech path to said called or calling party if said earphone key signal is inputted upon sensing a ring, connecting a speech path of said called or calling party by dialing a number of said called party if said earphone key signal is inputted after input of said telephone number thereof, and blocking a tone if said earphone key signal is not inputted for given time;

an audio processor for processing a voice upon calling by control of said micro processor; and an earphone-microphone selection unit for selecting said microphone of said earphone-microphone by said external microphone selection signal.

2. A communication process method of a portable phone for performing a communication by using an earphone-microphone including an earphone key, an earphone and a microphone comprising the steps of:

performing communication in the case that said earphone key is inputted, when a call is made from a counterpart;

dialing a number of said counterpart and then performing communication in the case that said earphone key is inputted after inputting the telephone number thereof when the call is not made from said counterpart; and closing communication in the case that said earphone key is inputted during communication.

* * * * *